Dec. 8, 1970 R. C. SIMONSEN 3,546,530

DIGITAL TACHOMETER CIRCUIT

Filed March 30, 1967

United States Patent Office 3,546,530

Patented Dec. 8, 1970

3,546,530
DIGITAL TACHOMETER CIRCUIT

Richard C. Simonsen, South Pasadena, Calif., assignor to Burroughs Corporation, Detroit, Mich., a corporation of Michigan Filed Mar. 30, 1967, Ser. No. 627,094
Int. Cl. G01p 3/00
U.S. Cl. 317—5 10 Claims

ABSTRACT OF THE DISCLOSURE

A tachometer circuit for sensing the speed of a rotating member. The circuit utilizes a detector for sensing the frequency of passage of a point on the member past the detector. Output pulses from the detector are used to control the operation of a switching circuit which in turn controls the output from the circuit. When the rotating member is below a predetermined speed, the switching circuit, periodically discharges a control capacitor. When the rotating member reaches a first predetermined speed, the switching circuit discontinues operation allowing the control capacitor to charge to a predetermined level causing a change in the output signal from the tachometer circuit. The output signal is then transmitted to a control mechanism such as a solenoid. A reduction in speed to a second speed below the first speed causes the output of the circuit to revert to its original level.

BACKGROUND OF THE INVENTION

This invention relates to an electrical circuit for determining the speed of a rotating member and in particular a circuit having a digital output wherein the level of the output from the circuit changes when the speed of the rotating member rises above or falls below certain predetermined threshold values.

Tachometer circuits for controlling the actuation of magnetic read and write heads in applications such as computers are already known. In U.S. Pat. 3,400,385 assigned to the assignee of the present application, there is described one type of tachometer circuit. In addition to this circuit, other circuits such as a manual speed sensing circuit described in U.S. Pat. 3,329,943, in which a portion of the operation of the circuit is dependent upon manual operations, are also known.

Briefly it is the function of these circuits to sense the speed of rotation of a member such as a magnetic disk. Responsive to the output from such a circuit, a control mechanism is actuated to position a magnetic read/write head at an operating location adjacent the disk when the disk achieves a predetermined angular velocity. If the angular velocity drops below a predetermined value, the circuit reverts to its original condition reactuating the control mechanism and removing the magnetic head from its operating position.

SUMMARY OF THE INVENTION

The present invention provides a tachometer circuit for sensing an upper and lower value of velocity of a moving member. The circuit comprises means for sensing the periodic passage of a point on the member past a fixed point in space and for generating a first signal responsive thereto. A storage circuit together with circuit means for placing a second signal in the storage circuit are also provided. The sensing means and storage circuit are coupled to first switch means which are arranged to remove the second signal from the storage circuit responsive to the first signal from the sensing means. Second switching means are coupled to the first switching means and the storage circuit for removing the second signal from the storage circuit independently of the first switching means.

The second switching means is responsive to a first signal frequency from the first switching means corresponding to the upper value of velocity and a second signal frequency corresponding to the lower value of velocity. Electrical circuit means are in turn coupled to the second switching means, the circuit means being arranged to assume a first condition responsive to the discharging means when the velocity of the moving member is below the upper value, a second condition when the velocity of the moving member exceeds the upper value and to return to the first condition when the velocity again drops below the lower value.

The present invention is adapted for use in a computer memory system where an air-bearing is utilized between a disk and the magnetic transducers used to record and read information magnetically recorded on the disk. To prevent damage to either the transducers or the disk while permitting extremely close spacing between the two for high density recording, the speed of the disk is required to reach a predetermined value in order that the air-bearing has sufficient viscosity to prevent contact between the two. To determine this condition a signal can be obtained from a rotating member such as the disk or the shaft on which the disk is mounted to indicate when the disk has achieved the proper speed to permit the positioning of the magnetic heads in close spatial relation to the disk. The present invention provides a tachometer circuit for sensing the achievement of the desired speed of the disk. When proper speed is achieved the circuit changes condition producing a signal which drives an air solenoids to "fly the heads," i.e., to position the magnetic heads adjacent the magnetic disk.

It is also desirable to provide the ability to sense when the speed of the disk drops below a certain predetermined threshold in order that the magnetic heads may be withdrawn to a retracted position before the viscosity of the air-bearing drops below a safe minimum. When a malfunction occurs, such as the drive belt breaking or the magnetic disk slows down for reasons due to problems elsewhere in the system, the angular velocity of the disk begins to diminish. At a predetermined value of angular velocity the tachometer circuit of this invention reverts to its former condition and transmits a signal to the air solenoid causing the magnetic heads to be retracted. In addition to performing the above functions, the present circuit has the additional advantages of economy and simplicity of design while providing a high degree of reliability.

These and other details of the invention will be better understood by reference to the following figures in which.

Figure 1:
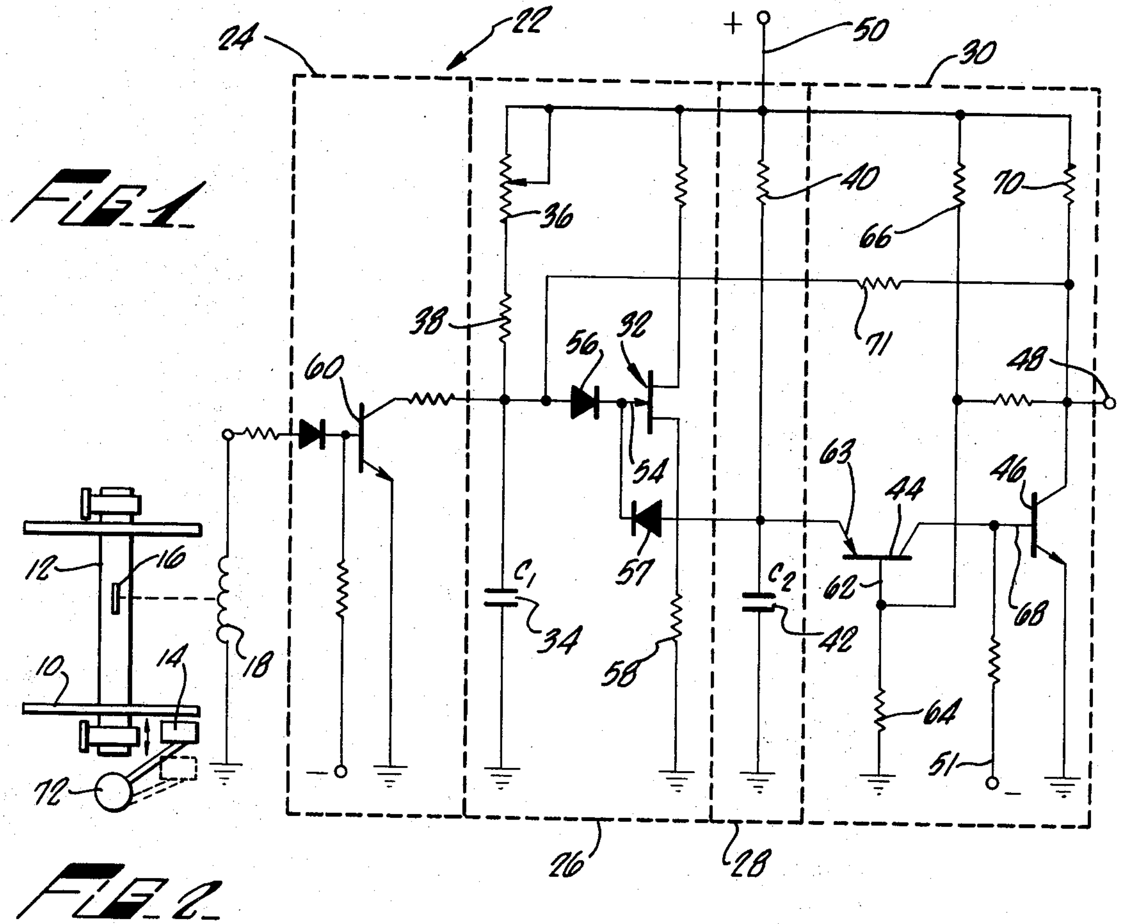
FIG. 1 is a schematic diagram of the circuit of the present invention.

Referring now to FIG. 1, a magnetic disk 10 is mounted on a rotating shaft 12 is shown with a magnetic head 14 positioned in its normal operating position adjacent the disk. The position of the magnetic head 14 when in the retracted or non-operating position is also indicated.

A slot 16 is located on rotating shaft 12 opposite a detector such as a magnetic pickup coil 18 which is responsive to rotation of slot 16 past the coil. Other means of creating a discontinuity such as a magnetic slug may be used as a substitute for slot 16. The slot-magnetic pickup embodiment is illustrative of a number of known methods for detecting the passage of a point on a rotating member past a fixed point in space. Repetitive passages of the slot past the coil produce a series of speed pulses 20 (see FIG. 2) in the coil which are directly proportional to the speed of the rotating member. When the rotational speed of the magnetic disk reaches a desired value, the magnetic heads 14 can be brought into position.

Speed pulses 20 are transmitted from coil 18 to a circuit 22 which includes a first switching circuit 24, a combined storage circuit and second switching circuit 26, an RC electric circuit combination 28 and a third switching circuit 30. Combined circuit 26 comprises a unijunction transistor 32, a capacitor 34 (C1), and resistors 36 and 38. RC combination 28 comprises a resistor 40 and a capacitor 42 (C2). Switching circuit 30 utilizes transistors 44 and 46 for sensing the charge on capacitor 42 and for transmitting a signal to output terminal 48. The output signal at terminal 48 is indicative of two conditions, the first being when the magnetic disk 10 is rotating below operating speed and the second condition being when the disk is rotating at or in excess of its operating speed.

In operation the circuit is connected to a source of positive voltage 50 and a source of negative voltage 51. In this condition before rotation of disk 10 is begun, capacitor 34 charges from voltage source 50 through resistors 36 and 38 toward a predetermined positive voltage. As capacitor 34 charges, the emitter 54 of unijunction transistor 32 is poled positive through diode 56. At some predetermined voltage, e.g., 7 volts (see FIG. 2), the unijunction transistor is arranged to fire thereby discharging capacitor 34 through transistor 32 and resistor 58.

At the same time that capacitor 34 is charging, capacitor 42 is also charging. Each time transistor 32 fires, capacitor 42 is discharged through diode 57, transistor 32 and resistor 58. The time constant of an RC network consisting of resistors 36 and 38 and capacitor 34 is chosen such that it is shorter than the time constant of RC network 28. This relationship between time constants of the two RC networks is provided so that the charge on capacitor 42 builds up at a slower rate than the charge on capacitor 34 (see FIG. 2) and does not reach a predetermined value which will effect the operation of switching circuit 30 until the rotational speed of the magnetic disk has achieved the desired angular velocity.

When shaft 12 is caused to rotate causing slot 16 to repetitively move past pickup 18, a series of pulses 20 are transmitted to switching circuit 24. The transmission of a pulse to the base of transistor 60 turns this transistor on thereby discharging capacitor 34 without firing unijunction transistor 32. This permits capacitor 42 to continue charging. The voltage level on the base electrode 62 of transistor 44 is determined by resistors 64 and 66. When capacitor 42 charges to this voltage level, e.g., 5 volts (see FIG. 2), the voltage on emitter electrode 63 is increased above the voltage determined by the resistors 64 and 66 causing transistor 44 to conduct. Conduction of transistor 44 causes current to flow through resistor 40, transistor 44 and the base electrode 68 of transistor 46. Current flow in the base electrode 68 of transistor 46 causes it to turn on thereby causing the output at output terminal 48 to drop from a voltage determined by resistor 70 to a different voltage, e.g., ground potential. The circuit output remains at this level until the rotational speed of shaft 12 decreases by a predetermined amount.

When the circuit output changes upon reaching the desired rotational speed, the charging rate of capacitor 34 is reduced due to resistor 71 and transistor switch having the effect of introducing a predetermined amount of hysteresis into the circuit. During the underspeed condition transistor 46 is off and the circuit for charging capacitor 34 is essentially comprised of the resistance of the parallel combination of resistor 71 and resistors 36 and 38. During the up to speed condition transistor 46 is on and the voltage at terminal 48 can be considered to be essentially circuit reference voltage. Resistor 71 now has the additional effect of providing a voltage dividing action which reduces the supply voltage available for charging capacitor 34. Thus in the up speed condition it takes longer for the voltage on capacitor 34 to rise to +7 volts (the unijunction breakdown voltage) and thereby the hysteresis effect is accomplished. In terms of an actual operating example, one embodiment of the circuit is arranged such that the periodic charge rate of the circuit during the underspeed condition is 40 milliseconds corresponding to 1500 r.p.m. The circuit changes state when the shaft speed increases beyond this speed. After changing state the new periodic charging rate is 41 milliseconds. This corresponds to 1463 r.p.m. Thus the circuit does not change back to its original underspeed condition until the shaft speed drops below 1463 r.p.m.

When the rotational speed of shaft 12 drops below a predetermined value, capacitor 34 again charges to a sufficient value to cause unijunction transistor 32 to fire. As before, firing of transistor 32 discharges capacitor 42 cutting off the current through transistor 44 to the base of transistor 46. Transistor 46 is thereby turned off restoring the output signal level at terminal 48 to the value before circuit operation.

The output from the tachometer circuit is utilized as follows: When the signal at terminal 48 changes as shaft 12 gets up to speed, this change is transmitted to a device such as an air solenoid (not shown) which in turn operates valve 72 causing magnetic head 14 to move from the ghosted position to a position adjacent disk 10, (shown in solid lines), i.e., the heads are "flown" into position. When the speed of the shaft drops below a predetermined value, the circuit output reverts to its original output level and the change in level again causes the air solenoid and valve 72 to operate causing the head to be retracted to the ghosted position.

Figure 2:
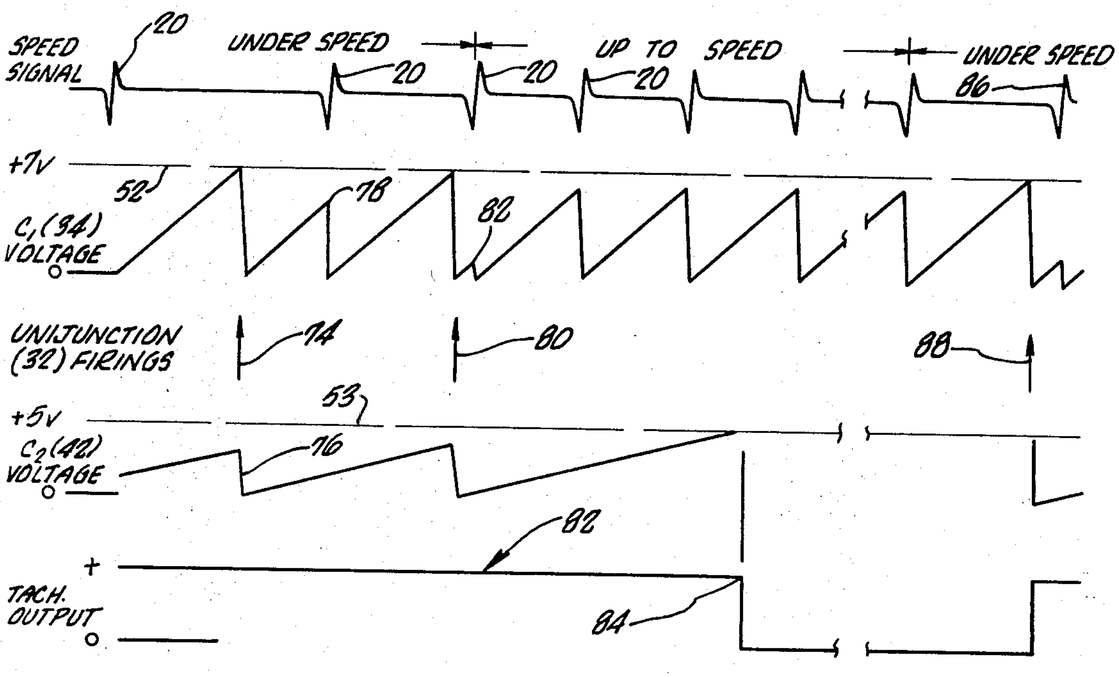
FIG. 2 is a diagram of the wave forms at various points in the circuit during the course of operation of the circuit.

Operation of the circuit will be more fully understood by reference to FIG. 2. As shown therein, speed signals in the form of pulses 20 from magnetic pickup 18 occur at a frequency depending upon the speed of rotation of the shaft 12. When the circuit is connected to a voltage source 50, capacitor 34 begins to charge to a predetermined level 52. Upon each occurrence of a pulse from magnetic pickup 18, transistor 60 is operated thereby discharging capacitor 34, as at 78 and 82. If the frequency of pulses 20 is not sufficiently high, capacitor 34 charges to voltage level 52 causing firings 74 and 80 of unijunction 32, each of said firings causing capacitor 34 to be discharged. At the same time capacitor 34 is charging, capacitor 42 is charging toward another predetermined voltage level 53. The longer time constant of the RC circuit including capacitor 42 in comparison with the time constant of the RC network including capacitor 34 produces the more gradual slope of the charging voltage 76 of capacitor 42 (C2).

When the unijunction transistor fires, as at 74, capacitor 42 is also discharged and then begins to recharge. Charging of capacitor 42 continues so long as transistor 32 is not permitted to fire. When the rotational speed achieves the desired value, pulses 20 are received at a sufficiently high rate to cause capacitor 34 to discharge through transistor switch 60. Discharge of capacitor 34 before reaching level 52 allows capacitor 42 to charge to predetermined level 53 causing transistors 44 and 46 to conduct, thereby changing the tachometer output 82. The conduction of transistors 44 and 46 is reflected in the change of the tachometer output at 84. When the rotational speed of the shaft drops below a predetermined value as at 86, capacitor 34 is again allowed to charge to level 52 causing the unijunction transistor to fire at 88 thereby discharging capacitor 42 and restoring the tachometer output to the value prior to firing at 84. Each change of output from the tachometer circuit of this invention is utilized to "fly" the heads into proper position once proper rotational speed has been achieved and to withdraw the heads when the speed of the disk drops below a certain safe minimum.

What is claimed is:

1. A tachometer circuit for sensing an upper and lower value of velocity of a moving member comprising:

means for sensing the periodic passage of a point on the member past a fixed point in space and for generating a first signal responsive thereto;

a storage circuit;

circuit means for placing a second signal in the storage circuit;

first switching means coupled to the sensing means and to the storage circuit for removing the second signal from the storage circuit responsive to the first signal from the sensing means;

second switching means coupled to the first switching means and the storage circuit for removing the second signal from the storage circuit independently of the first switching means, said second switching means being responsive to a first signal frequency from the first switching means corresponding to the upper value of velocity and a second signal frequency corresponding to the lower value of velocity; and electrical circuit means coupled to the second switching means, said circuit means being arranged to assume a first condition responsive to the second switching means when the velocity of the moving member is below said upper value, a second condition when the velocity of said moving member exceeds said upper value and to return to said first condition when the velocity drops below said lower value.

2. A tachometer circuit for indicating the angular velocity of a rotating member comprising:

first and second storage circuits each having a circuit for storing a signal therein at a predetermined rate;

first switching means for receiving signals having a frequency corresponding to the velocity of a rotating member and for periodically changing conductive conditions to remove at least a portion of the stored signal from said first storage circuit at a frequency corresponding to said frequency of signals;

second switching means responsive to a predetermined level of stored signal in said first storage circuit for changing conductive conditions and removing at least a portion of the stored signal from said second storage circuit; and third switching means coupled to said second storage circuit for providing a predtermined output signal when the stored signal attains a predetermined level.

3. In a computer memory having at least one rotating disk coated with magnetic material for the storage of information thereon and at least one magnetic transducer for the recording or detecting of information on the disk, said transducer being positionable in close spatial relationship adjacent the disk responsive to attainment of a first predetermined rotational velocity of said disk and retractable responsive to a decrease in rotational velocity to a second predetermined rotational velocity, the improvement comprising:

a tachometer circuit for determining the rotational velocity of the disk, said circuit comprising a magnetic transducer for sensing the frequency of rotation of a shaft on which said disk is mounted;

a transistor switch connected to said transducer, said switch being operable responsive to pulses from said transducer;

a unijunction transistor oscillator connected to said transistor switch, said oscillator including a first capacitor and resistor network having a first time constant, operation of sad transistor oscillator being determined by said transistor switch;

a source of voltage for charging the capacitor in said first network;

a second capacitor and resistor network connected in electrical circuit relationship with the output of said oscillator, said second network having a second time constant longer than said first time constant;

a pair of transistor switches connected in electrical circuit relationship between said second RC network and an output terminal from said tachometer circuit, said transistor switches being operable responsive to a predetermined value of voltage on the capacitor in said second network, operation of said switches causing a change in the voltage from the output of said tachometer circuit; and impedance means connected between the output and said first network for lengthening said first time constant a predetermined amount, said longer time constant being determined by said second predetermined rotational velocity.

4. A tachometer circuit for sensing an upper and lower value of angular velocity of a rotating member comprising:

means for sensing the passage of a point on the rotating member past a fixed point in space for generating a signal responsive thereto;

first switching means connected to the sensing means;

first circuit means having a first time constant connected between the first switching means and a second switching means, said second switching means being responsive to the condition of said first circuit means;

second circuit means having a second time constant connected to the second switching means, said first time constant being shorter than said second time constant, said second circuit means being arranged to assume a first condition responsive to the second switching means when the angular velocity of said rotating member is below a first predetermined value and a second condition when the angular velocity of said rotating member exceeds said first predetermined value; and third switching means responsive to the condition of said second circuit means for changing an output signal from the tachometer circuit.

5. A circuit according to claim 4 including means for introducing a predetermined amount of hysteresis in said circuit whereby said circuit reverts to said first condition when the angular velocity of said rotating member decreases from said upper value to said lower value.

6. A circuit according to claim 5 wherein said second switching means includes a unijunction transistor.

7. A circuit according to claim 6 wherein said first circuit means includes an RC network.

8. A circuit according to claim 7 wherein said second circuit means includes an RC network.

9. A circuit according to claim 8 wherein the means for sensing the passage of a point on the rotating member is a magnetic pickup.

10. A circuit according to claim 9 wherein said first and third switching means are transistor switches.

References Cited

UNITED STATES PATENTS 3,351,811 11/1967 Buckley -------------- 317—5

J D MILLER, Primary Examiner

W. J. SMITH, Assistant Examiner

U.S. Cl. X.

317—19; 318—326; 324—70; 340—174.1